(12) United States Patent
Shapiro

(10) Patent No.: US 7,726,504 B2
(45) Date of Patent: Jun. 1, 2010

(54) FIRE-PROTECTIVE PACKAGING SYSTEM AND METHOD

(76) Inventor: Jeffrey M. Shapiro, 8207 Asmara Dr., Austin, TX (US) 78750

( * ) Notice: Subject to any disclaimer, the term of this patent is extended or adjusted under 35 U.S.C. 154(b) by 63 days.

(21) Appl. No.: 12/278,396

(22) PCT Filed: Feb. 7, 2007

(86) PCT No.: PCT/US2007/061771

§ 371 (c)(1),
(2), (4) Date: Dec. 1, 2008

(87) PCT Pub. No.: WO2007/092889

PCT Pub. Date: Aug. 16, 2007

(65) Prior Publication Data

US 2009/0218111 A1 Sep. 3, 2009

Related U.S. Application Data

(60) Provisional application No. 60/765,723, filed on Feb. 7, 2006.

(51) Int. Cl.
B65D 1/40 (2006.01)
(52) U.S. Cl. .................................................. 220/62.22
(58) Field of Classification Search .............. 220/62.22, 220/62.19, 62.11, 495.01, 560.11, 560.05, 220/560.03, 560.01; 442/136
See application file for complete search history.

(56) References Cited

U.S. PATENT DOCUMENTS

| 5,984,126 A | 11/1999 | Gordon |
| 2008/0078768 A1 | 4/2008 | Apostoluk |

*Primary Examiner*—Arti Singh-Pandey
(74) *Attorney, Agent, or Firm*—Miles & Stockbridge P.C.

(57) ABSTRACT

A packaging system or method for protecting combustible material in a sprinkler-provided environment has an outer layer with a combustible surface covering a fire-retardant protection layer. Combustion of the surface of the outer layer promotes effective sprinkler operation, while combustible material is protected by the fire-retardant protection layer.

13 Claims, 1 Drawing Sheet

FIRE-PROTECTIVE PACKAGING SYSTEM AND METHOD

CROSS-REFERENCE TO RELATED APPLICATION

This application claims the benefit of Provisional Application 60/765,723 filed Feb. 7, 2006, incorporated herein by reference.

BACKGROUND OF THE INVENTION

This invention relates to the protection of combustible materials.

One approach to fire protection of combustible materials in vessels, such as plastic containers packaged in corrugated boxes, has been to use fire-retardant corrugated paperboard packaging materials, which may be fire-retarded by an applied spray or impregnation method. Another approach has attempted to protect large plastic intermediate bulk containers, often holding hundreds of gallons of combustible liquid, by placing the primary liquid container beneath an insulating blanket or inside of a metallic outer enclosure (sometimes referred to in the industry as a "spam can".

Both of these "traditional" approaches attempt to delay or prevent failure of a packaging system by reducing heat transfer to and/or slowing combustion of outer or intermediate layers of packaging material. Both of these approaches rely on concentric protection layers, with the outermost layer being non-combustible or fire-retardant. However, these approaches are often deficient in buildings protected by automatic fire sprinkler systems, because they can delay the operation of the sprinklers, which otherwise control or suppress the fire.

Packaging systems using non-combustible or fire-retardant outer shell materials can be counter-productive in a building equipped with a fire sprinkler system because of reduction of initial fire growth and flamespread across surfaces of stored goods, required for rapid operation of the sprinklers that are necessary for fire control. By delaying operation of fire sprinklers, the period of un-mitigated fire exposure to stored goods is extended. Extended exposure to a severe fire will cause failure of traditional package protection systems (described above) by eventually consuming a fire-retarded combustible exterior layer or, in the case of a "spam can", transferring sufficient heat to a liquid container inside to cause the container to fail and release its contents. Such a release of contents has been repeatedly demonstrated to be catastrophic, resulting in fires that exceed the capability of traditional fire sprinkler systems.

An additional disadvantage of the "spam can" design is that the metallic exterior is not absorbent, which limits the effectiveness of sprinklers in pre-wetting containers that have not yet been damaged by fire. Absorbent exterior surfaces, such as those made of corrugated paperboard, have the advantage of absorbing water from sprinkler discharge, which pre-wets packages surrounding a fire and delays their ignition.

BRIEF DESCRIPTION OF THE INVENTION

The present invention is based upon the discovery that successful fire control by sprinklers requires a unique balance, i.e., a reasonably fast burning fire to operate sprinklers, but fire growth not so rapid as to cause loss of package integrity before sprinklers gain control of the fire.

Contrary to traditional practice, the present invention deliberately provides a combustible exterior surface on a packaging system and places a fire-retardant protection layer beneath the exterior surface. As used herein, the term "fire-retardant protection layer" means a layer within a packaging system that slows transmission of fire from the exterior surface to the material to be protected (e.g., packaged goods) and thereby insulates the protected material from the fire at the exterior surface. According to the invention, the outer surface of a packaging system is allowed to burn normally, while heat transfer or fire spread to a package interior is delayed. By virtue of the combustion of the outer surface of the packaging system, fire sprinklers respond to control a fire. At the same time, the fire-retardant protection layer protects the material within the packaging system.

BRIEF DESCRIPTION OF THE DRAWINGS

The invention will be further described in conjunction with the accompanying drawings, which illustrate preferred (best mode) embodiments, and wherein.

DETAILED DESCRIPTION OF THE INVENTION

Figure 1:
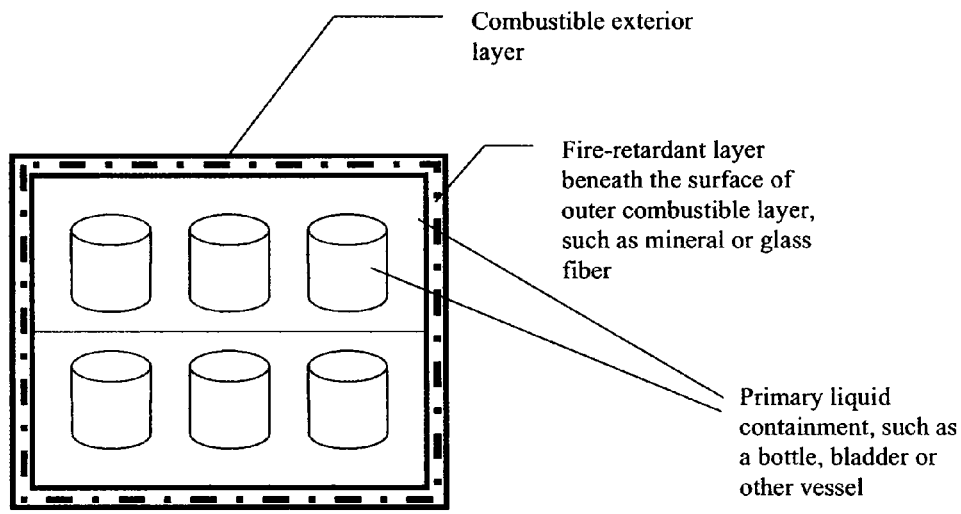
FIG. 1 is a diagrammatic view showing a first embodiment of the invention.

While, theoretically, the fire-retardant protection layer used in the invention can be applied at the interior of a package, this approach can lead to a loss of strength of the packaging system, by combustion of structural layers outside of the protection layer. Thus, in accordance with the invention, it is preferred to place the fire-retardant protection layer outside of the interior of a package, between the outer combustible surface or layer of the packaging system and the interior of the package. In one practical embodiment, the fire-retardant protection layer is placed between an outer combustible wall of a packaging system and an inner wall of the packaging system. See FIG. 1.

The fire-retardant protection layer allows a limited amount of material of the packaging system to be consumed by fire, contributing to effective operation of fire sprinklers, while protecting integrity of the packaging system. To be sufficient, the fire-retardant protection layer must survive a severe fire exposure for a period of time that is long enough to maintain integrity of the packaging system until sprinklers operate and begin to control the fire.

Thermal mass and insulating value are key properties of an effective fire-retardant protection layer. As an effective fire-retardant protection layer, sheet wood products can provide sufficient thermal mass to slow heat transfer to inner packaging materials and delay burn-through times. Better fire-retardant insulating materials, such as mineral, glass, or ceramic fiber are even more effective. In one test, using Insulfrax Marine Blanket as the fire-retardant protection layer, an outer sidewall of a double-layer corrugated paperboard box was completely consumed without damaging either the Insulfrax material or inner layers that it protected. Insulfrax Marine Blanket is available from Unifrax Corporation of Niagra Falls, N.Y.

Fire-retardant paperboard as a fire-retardant protection layer was tested and found to have insufficient thermal mass or ignition resistance to prevent rapid consumption when exposed to a severe fire. Also, an intumescent coat of corrugated paperboard interiorly of the outer surface tends to perform poorly, because such a coating must face an open space for exposure to a fire in order to perform adequately.

Fire-retardant protection layers of sheet wood products and Insulfrax, located beneath a combustible exterior shell, have been demonstrated to have the ability to protect individual packages, pallet loads, or intermediate bulk containers for a period of time sufficient to permit effective operation of fire sprinklers, estimated at between 5 and 20 minutes after ignition in typical warehouse environments.

Figure 2:
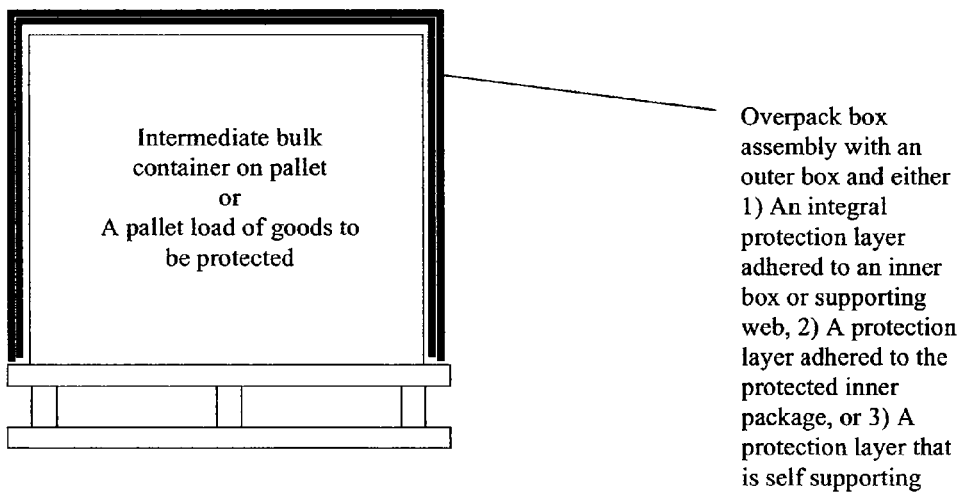
FIG. 2 is a diagrammatic view showing a second embodiment of the invention.

One practical embodiment of the invention uses an overpack box that has a combustible exterior surface, a fire-retardant protection layer, and an inner layer or web capable of providing structural support to the fire-retardant protection layer once the outer layer is consumed by fire. A significant advantage of the overpack box approach is that it requires little or no modification to the primary package. The overpack box, including fire-retardant insulation, can simply be added to a finished container, and may be reusable. See FIG. 2.

Another practical embodiment of the invention uses a fire-retardant protection layer adhered to the exterior of a primary package and places a corrugated paperboard box over the fire-retardant protection layer.

A further practical embodiment of the invention uses a fire-retardant protection layer that is self-supporting, such as a material in the configuration of a formed board.

Furthermore, a combustible exterior surfacing material or layer can be added to an otherwise non-combustible packaging surface, such as a "spam can", to provide a thin layer of fuel to enhance sprinkler operation. Such an embodiment could be effective without an additional fire-retardant protection layer beneath the exterior surfacing material if the primary package is capable itself of providing a fire-retardant protective layer, delaying significant heat transmission to protected goods or inner packaging layers until sprinklers are able to control the fire exposing the container.

These embodiments can provide protection of individual containers, pallet loads of goods, or intermediate bulk containers constructed using corrugated paperboard, plastic, "bottle-in-cage" or "spam can" techniques.

In the utilization of the invention, it is desired that the outer layer material of the package system not be excessively combustible. In sprinklered buildings, an exterior packaging material that is excessively combustible may cause sprinkler failure due to rapid and severe growth. In an un-sprinklered building, where protected packages may be placed at some point in their lifecycle, using a packaging material that accelerates a fire at a rate exceeding that of ordinary combustible materials might cause excessive damage.

A suitable compromise uses corrugated paperboard as an exterior combustible material. Corrugated paperboard is regarded as an ordinary cellulosic material likely to be present in any commercial warehouse environment, and it has adequate mass and flame propagation properties to effect the operation of fire sprinklers. Materials in this realm will have a potential heat on the order of 8,000 btu/lb and a flamespread index not exceeding 200 based on the ASTM E84 Steiner Tunnel test apparatus.

While preferred embodiments of the invention have been shown and described, changes can be made without departing from the principles and spirit of the invention, the scope of which is defined in the claims which follow.

What is claimed is:

1. A packaging system for protecting combustible material in a sprinkler-provided environment, comprising:
    a package to contain combustible material and having an outer layer and an inner layer, wherein the outer layer has a combustible surface and is separated from the inner layer by a fire-retardant protection layer, whereby combustion of the surface of the outer layer promotes effective sprinkler operation, while the combustible material is protected by the fire-retardant protection layer.

2. The packaging system of claim 1, wherein the outer layer comprises a paperboard material and the fire-retardant protection layer comprises a wood product or a mineral, glass, or ceramic fiber material.

3. The packaging system of claim 1, wherein the inner layer comprises a wall of an intermediate bulk container.

4. The packaging system of claim 1, wherein the package surrounds an intermediate bulk container.

5. A method of providing fire protection for a combustible material in a sprinkler-provided environment, comprising:
    surrounding the combustible material in a package having a combustible outer surface covering a fire-retardant protection layer, such that combustion of the outer surface promotes effective sprinkler operation while the combustible material is protected by the fire-retardant protection layer.

6. The method of claim 5, wherein the outer surface is provided by a paperboard material and the fire-retardant protection layer is provided by a wood product or mineral, glass, or ceramic fiber material.

7. The method of claim 5, wherein the fire-retardant protection layer is provided between the outer surface and an inner wall.

8. The method of claim 5, wherein the package surrounds an inner package containing the combustible material.

9. A packaging system for protecting combustible material in a sprinkler-provided environment, comprising:
    a package to contain combustible material and having a combustible outer surface over a fire-retardant protection layer, whereby combustion of the outer surface promotes effective sprinkler operation, while the combustible material is protected by the fire-retardant protection layer.

10. The packaging system of claim 9, wherein the fire-retardant protection layer is attached to the outer surface.

11. The packaging system of claim 9, wherein the fire-retardant protection layer is attached to an inner layer.

12. The packaging system of claim 9, wherein the fire-retardant protection layer is self-supporting.

13. The packaging system of claim 9, wherein the fire-retardant protection layer is part of an inner package.

* * * * *